United States Patent [19]

Takasaki

[11] Patent Number: 5,221,129
[45] Date of Patent: Jun. 22, 1993

[54] MULTI-PORT SOLENOID VALVE IN AN ANTISKID BRAKE CONTROL APPARATUS

[75] Inventor: Yoshiyasu Takasaki, Higashimatsuyama, Japan

[73] Assignee: Jidosha Kiki Co., Ltd., Tokyo, Japan

[21] Appl. No.: 765,760

[22] Filed: Sep. 26, 1991

[30] Foreign Application Priority Data

Oct. 16, 1990 [JP] Japan .................. 2-276881

[51] Int. Cl.$^5$ .............................. B60T 8/36
[52] U.S. Cl. ...................... 303/119.2; 303/117.1
[58] Field of Search ...... 303/119 SV, 116 R, 116 SP, 303/D1, D2, 117, 119.2, 116.1, 116.2; 137/596.17

[56] References Cited

U.S. PATENT DOCUMENTS 4,738,493 4/1988 Inagaki et al. ............... 303/116 R
4,915,459 4/1990 Hashida et al. ............. 303/119 SV

FOREIGN PATENT DOCUMENTS 0301157 12/1988 Japan .
0132449  5/1989 Japan ..................... 303/119 SV Primary Examiner—Matthew C. Graham
Attorney, Agent, or Firm—Varndell Legal Group

[57] ABSTRACT

A discharge passage communicating a brake cylinder and a low-pressure accumulator is provided with a second orifice. Owing to a pressure differential between pressure upstream of the second orifice and pressure downstream of the orifice, a passage changeover valve is set to a first position, when brake cylinder pressure is decreased during antiskid braking control, at which the passage changeover valve cuts off the discharge side of a pump from the brake cylinder, and to a second position, when brake cylinder pressure is increased, at which the changeover valve communicates the discharge side of the pump with a flow-rate controller and communicates the discharge side of the pump with a master cylinder and the brake cylinder solely through a first orifice in the flow-rate controller. As a result, when pressure is decreased during antiskid braking control, the discharge side and the intake side of the pump are completely cut off from each other so that the burden upon the pump is reduced.

7 Claims, 4 Drawing Sheets

MULTI-PORT SOLENOID VALVE IN AN ANTISKID BRAKE CONTROL APPARATUS

BACKGROUND OF THE INVENTION

This invention relates to an antiskid brake control apparatus for controlling the skidding of the wheels of a vehicle at the time of braking.

Antiskid brake control involves repeating the operations of detecting skidding of a wheel at braking through use of an electronic control unit, eliminating skidding by reducing brake pressure and then subsequently increasing braking pressure again, thereby stabilizing steering of the vehicle at braking and making the braking distance as short as possible.

An example of a control apparatus for performing antiskid brake control of this kind is disclosed in the specification of U.S. Pat. No. 4,715,666. The disclosed antiskid brake control apparatus includes a normally-closed two-way solenoid valve which decreases brake pressure by opening and increases brake pressure by closing, and a metering spool valve which, at a decrease in pressure, shuts a passage directly communicating a wheel cylinder and a master cylinder and communicates the passage to the intake side of a pump via the open two-way solenoid valve, and which reduces the slope of a pressure increase when pressure is increased again.

The metering spool valve has a fixed orifice formed in a metering spool, and a variable orifice including a port and a land which is formed on the metering spool. At a decrease in pressure, brake fluid from the master cylinder and brake fluid discharged from the pump flow through the fixed orifice and variable orifice to produce a differential pressure by which the metering spool is moved. The metering spool is positioned at a location at which the pressure differential and the biasing force of a spring balance each other.

In the antiskid brake control apparatus described above, the pump is driven when antiskid braking control is applied. However, when the pressure is decreased at opening of the two-way solenoid valve, the discharge side and intake side of the pump are communicated via the fixed orifice and variable orifice, and therefore the load upon the pump takes on a large value. As a consequence, it is necessary to increase the discharge capacity of the pump. The result is a pump of large size.

For this reason, an antiskid brake control apparatus has been developed in which a three-way solenoid changeover valve is used to completely cut off the discharge and intake sides of the pump at a decrease in pressure. In accordance with this antiskid brake control apparatus, a large burden on the pump is avoided when pressure is decreased. However, since this antiskid brake control apparatus employs the three-way solenoid changeover valve, there are two valve-seat locations for the ball constituting the valve body, and the valve passages are complicated as well. In addition, the overall control apparatus is large in size and complicated in structure.

SUMMARY OF THE INVENTION

An object of the present invention is to provide a small-size, structurally simple antiskid brake control apparatus in which the discharge and intake sides of the pump can be completely cut off at a decrease in pressure even though a two-way solenoid valve is used.

According to the present invention, the foregoing object is attained by providing an antiskid brake control apparatus comprising a first supply passage for communicating a master cylinder and a brake cylinder, a shut-off valve arranged in the first supply passage for shutting off the first supply passage at antiskid braking control, a sump device into which brake fluid supplied to the brake cylinder is discharged, a discharge passage for communicating the brake cylinder and the sump device; a normally-closed two-way solenoid valve provided in the discharge passage, a second supply passage provided in the first supply passage for communicating the master cylinder and the brake cylinder while bypassing the shut-off valve, flow-rate control means having a first orifice arranged in the second supply passage for limiting flow of brake fluid from the master cylinder and from a discharge side of a pump to the brake cylinder, the pump for feeding under pressure and circulating brake fluid, which has accumulated in the sump device, to the second supply passage on a side thereof upstream of the first orifice, a second orifice provided in the discharge passage, and a passage changeover valve arranged in the second supply passage for communicating or cutting off the discharge side of the pump and the brake cylinder, wherein pressure (P1) upstream of the second orifice is introduced to one end face of the passage changeover valve and pressure (P2) downstream of the second orifice is introduced to the other end face of the passage changeover valve to produce a pressure differential ($\Delta P = P1 - P2$) whereby the passage changeover valve is set to a first position, when brake cylinder pressure is decreased during antiskid braking control, at which the passage changeover valve cuts off the discharge side of the pump and the brake cylinder, and to a second position, when brake cylinder pressure is increased during antiskid braking control, at which the passage changeover valve communicates the discharge side of the pump with the flow-rate control means and communicates the discharge side of the pump with the master cylinder and the brake cylinder solely through the first orifice in the flow-rate control means.

At a decrease in pressure during antiskid braking control in the antiskid brake control apparatus according to the present invention constructed as set forth above, the discharge side of the pump is completely cut off not only from the brake cylinder but from the intake side as well. Accordingly, brake fluid discharged from the pump is not consumed, and therefor the burden upon the pump is alleviated. As a result, the discharge capacity of the pump need not be enlarged and a comparatively small pump will suffice.

In addition, since a two-way solenoid valve is used, the overall control apparatus can be made small in size and the structure thereof is simplified greatly.

Still other objects and advantages of the invention will in part be obvious and will in part be apparent from the specification. The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENT

Figure 1:
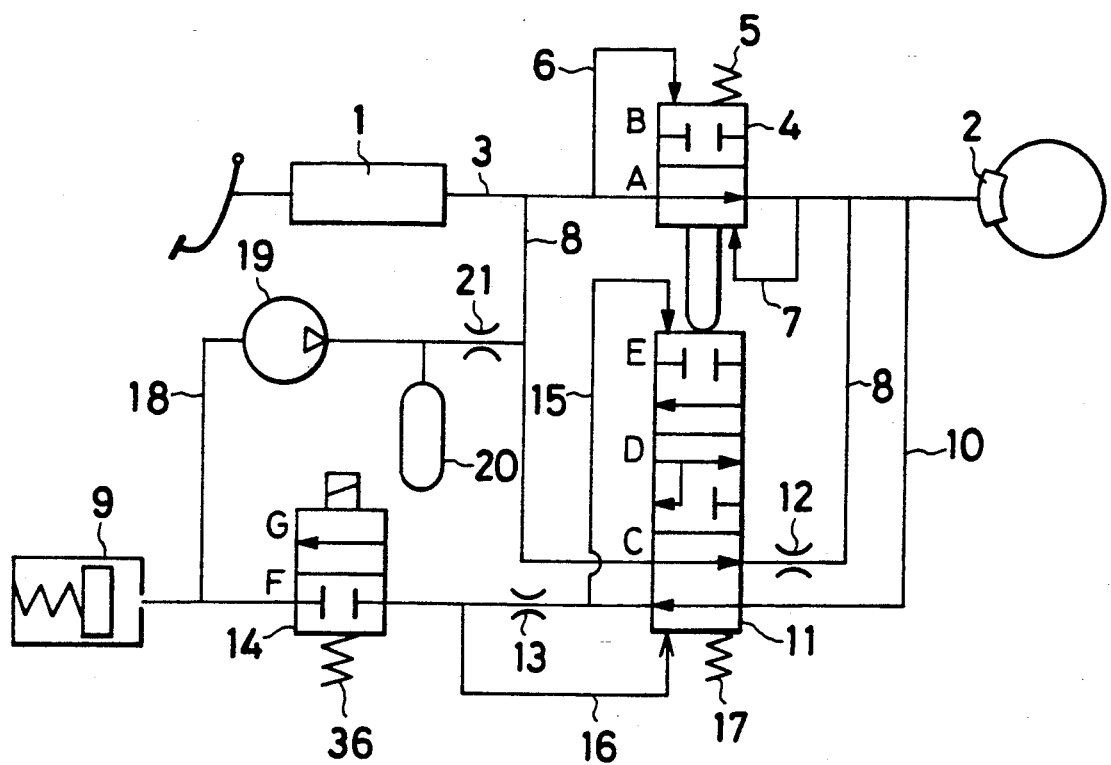
FIG. 1 is a brake control circuit diagram in an embodiment of an antiskid brake control apparatus according to the present invention.

As shown in FIG. 1, a shut-off valve 4 comprising a two-position, two-way valve is arranged in a brake-fluid supply passage 3 connecting a brake master cylinder 1 and a brake cylinder 2 of a wheel. The shut-off valve 4 is set to a communication position A at which the valve opens the supply passage 3, or a shut-off position B at which the valve closes the supply passage 3. Accordingly, the supply passage 3 corresponds to the first supply passage which is a characterizing feature of the invention. The shut-off valve 4 is urged in the direction of the shut-off position B by the spring force of a spring 5 and pressure, upstream of the shut-off valve 4, introduced through a pilot passage 6, namely pilot pressure resulting from pressure in the master cylinder 1. The shut-off valve 4 is urged in the direction of the communication position A by pressure, downstream of the shut-off valve 4, introduced through a pilot passage 7, namely pilot pressure resulting from pressure in the brake cylinder 2, and the spring force of a spring 17. Under ordinary conditions, the shut-off valve 4 is set at the communication position A.

A bypass passage 8 for bypassing the shut-off valve 4 is provided so as to bypass the supply passage 3. In addition, a discharge passage 10 which connects the brake cylinder 2 and a sump device 9 is provided so as to communicate with the supply passage 3. A passage changeover valve 11 comprising a three-position, four-way valve is arranged between the bypass passage 8 and the discharge passage 10. The passage changeover valve 11 is capable of being set at a C position at which it opens both passages 8 and 10, a D position at which it opens the bypass passage 8 and shuts the discharge passage 10, and an E position at which it shuts the bypass passage 8 and opens the discharge passage 10. The bypass passage 8 corresponds to the second supply passage which is a characterizing feature of the invention.

An orifice 12, which corresponds to the first orifice of the invention, is arranged in the bypass passage 8 downstream of the passage changeover valve 11, and an orifice 13, which corresponds to the second orifice of the invention, is arranged in the discharge passage 10 downstream of the passage changeover valve 11. Further, a pressure-reducing valve 14 comprising a two-position, two-way solenoid valve is arranged between the orifice 13 and the sump device 9. The pressure-reducing valve 14 is capable of being set at a shut-off position F at which it shuts the discharge passage 10 at the time of ordinary operation, and at a communication position G at which it opens the discharge passage 10 when pressure is decreased during antiskid braking control.

The arrangement is such that the passage changeover valve 11 is urged from the E position to the D position and from the D position to the C position by pilot pressure P1 resulting from pressure, upstream of the orifice 13, introduced through a pilot passage 15, and from the C position to the D position and from the D position to the E position by pilot pressure resulting from pressure P2, downstream of the orifice 13, introduced through a pilot passage 16, and by the force of a spring 17.

The sump device 9 is connected to the bypass passage 8 upstream of the passage changeover valve 11 via a passage 18. A pump 19, a volume chamber 20 and an orifice 21 are arranged in the passage 18.

Figure 2A:
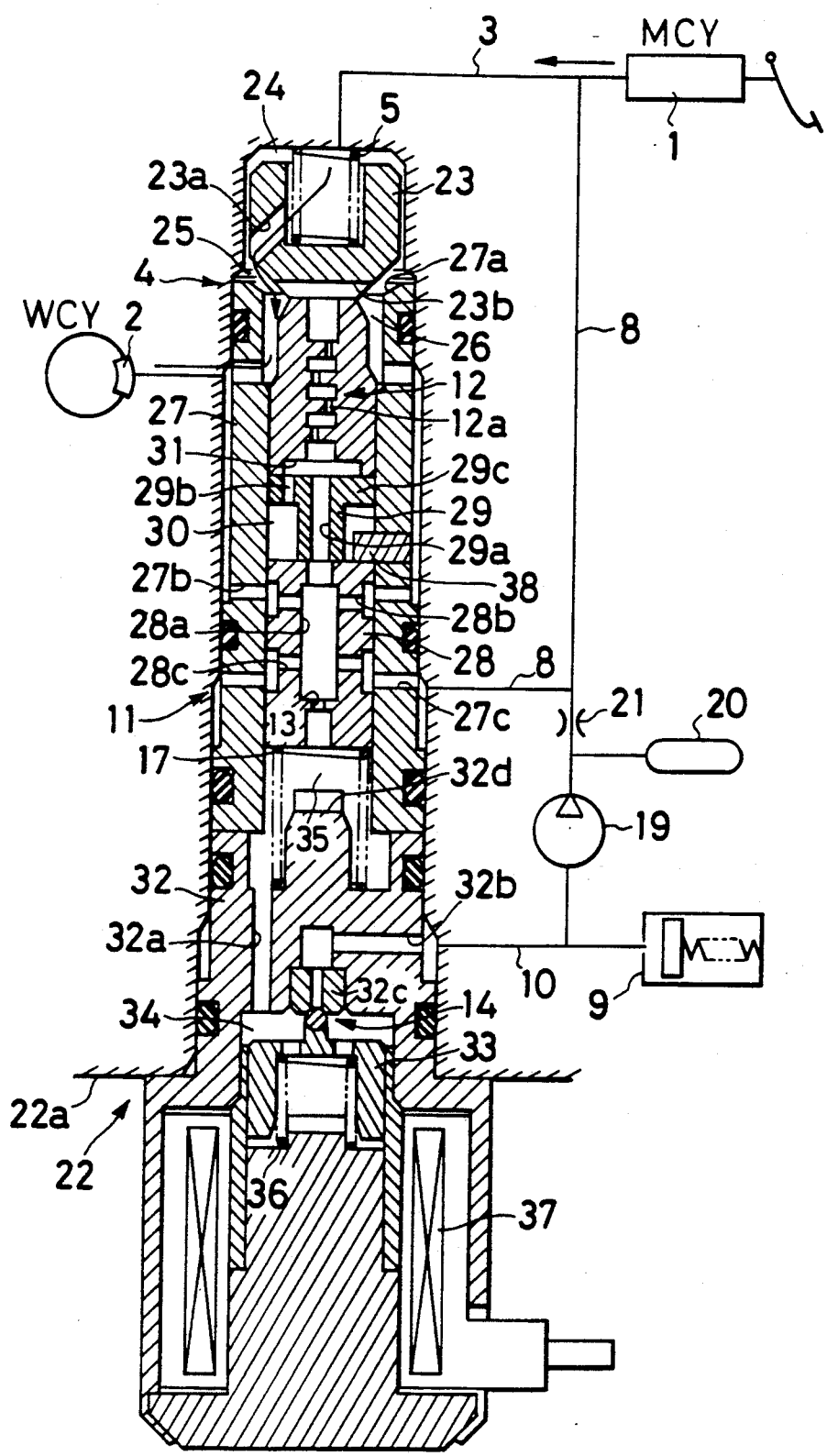
FIGS. 2(a), (b) and (c) are sectional views showing a valve assembly comprising a shut-off valve, a passage changeover valve and a pressure reducing valve, in which (a) illustrates the valve assembly in an ordinary braking state, (b) the valve assembly in a state of reduced pressure, and (c) the valve assembly in the state which prevails when pressure is increased again.
Figure 2B:
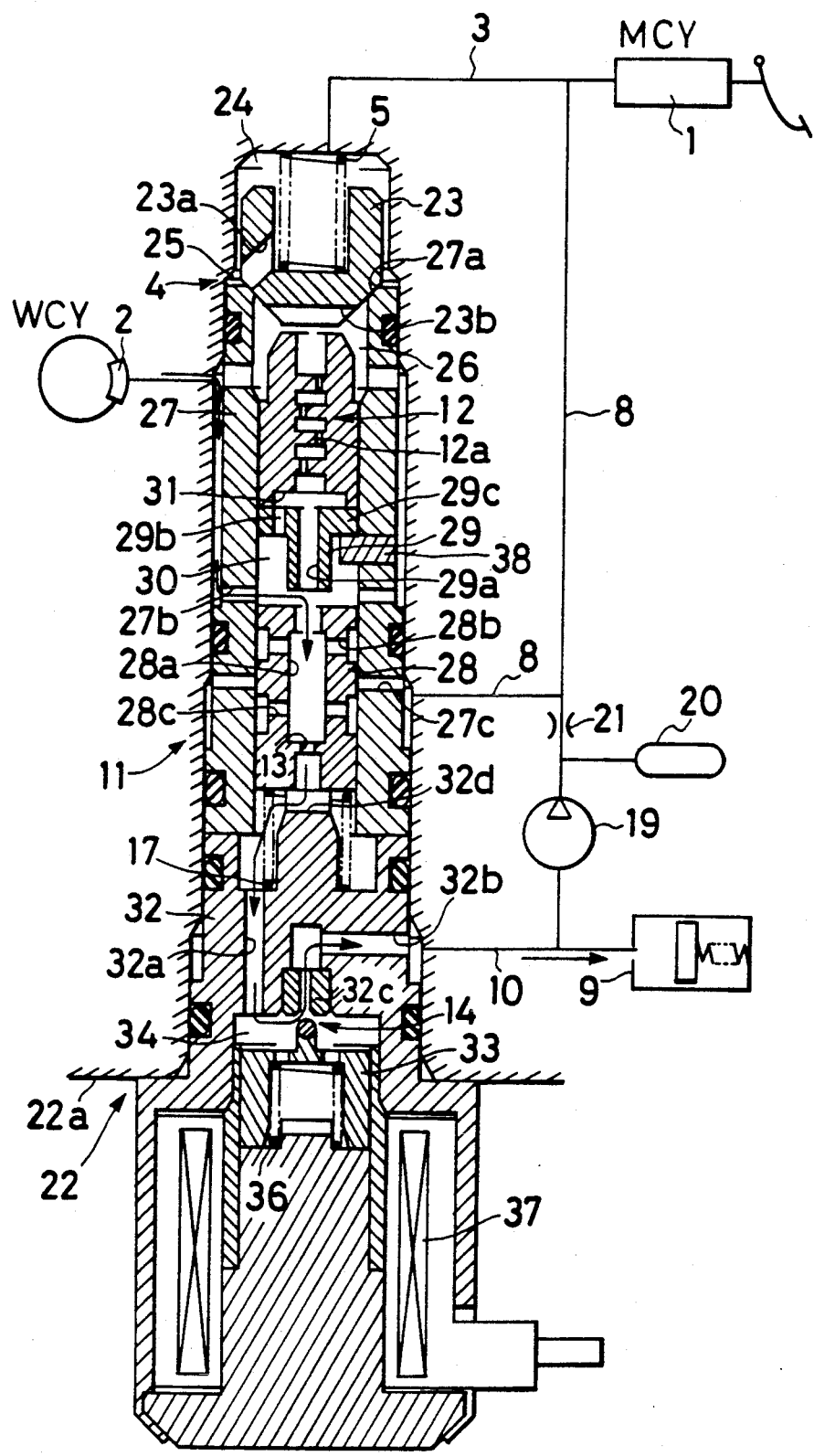
Figure 2C:
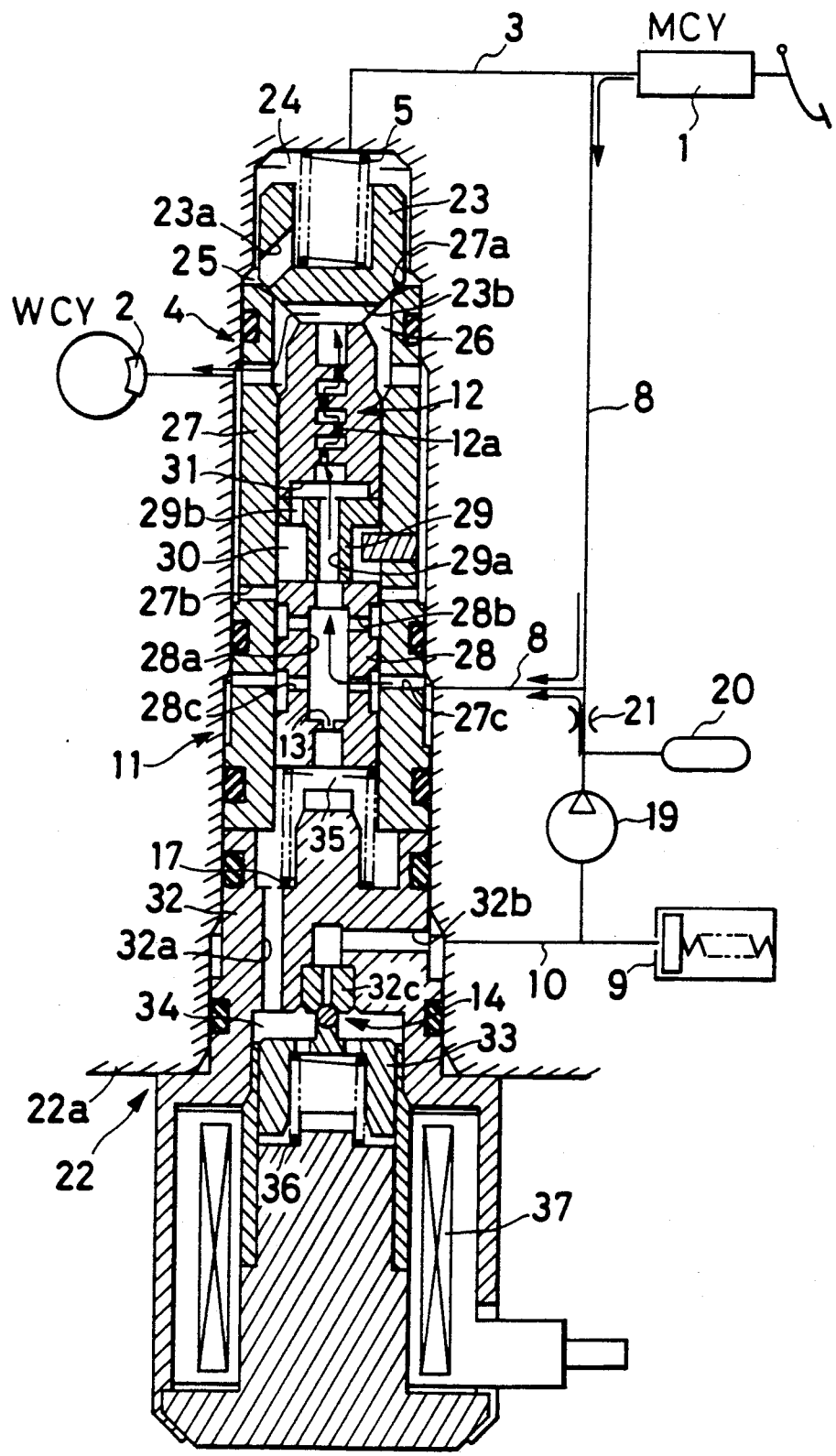

As illustrated in FIGS. 2(a) through 2(c), the shut-off valve 4, passage changeover valve 11 and pressure-reducing valve 14 are constructed as a single valve assembly 22. The valve assembly 22 has a main body 22a provided with a bore. A valve body 23 is inserted into the innermost portion (the upper portion in these drawings) of the bore and is capable of sliding in the axial direction. The valve body 23 is formed to have a passageway 23a communicating chambers 24, 25 on the upstream and downstream sides, respectively, of the valve body 23, and a channel 23b communicating the downstream side of the orifice 12 and a chamber 26 that is in communication with the brake cylinder 2. The valve body 23 is urged downwardly at all times by the spring 5.

A valve housing 27, which is not slidable in the axial direction, is inserted into the bore of the main body 22a and is situated below the valve body 23. The upper end of the valve housing 27 is formed to have a valve seat 27a which seats the valve body 23. When the valve body 23 is seated on the valve seat 27a, the chambers 25 and 26 are cut off from each other. The valve body 23 and the valve seat 27a construct the shut-off valve 4.

The valve housing 27 is formed to include an axially extending bore having an upper portion in which the movable orifice 12 is inserted and capable of sliding in the axial direction, and a lower portion in which spool valve body 28 is inserted and capable of sliding in the axial direction. The movable orifice 12 is equipped with orifice holes 12a arranged in several stages. The lower end of the movable orifice 12 has a spacer 29 for assuring a minimum spacing in such a manner that a chamber 30 is formed between the movable orifice 12 and the spool valve body 28. The spacer 29 is formed to have two axially extending holes 29a, 29b which communicate the chamber 30 with a chamber 31 on the upstream side of the movable orifice 12. The movable orifice 12 constructs the flow-rate control means of the present invention.

The spool valve body 28 is provided with an axially extending bore 28a, and with upper and lower diametrically extending holes 28b, 28c communicating the bore 28a with the outer periphery of the spool valve body 28. The spool valve body 28 is biased upwardly at all times by the spring 17.

The valve assembly 22 is designed in such a manner that upward and downward sliding movement of the spool valve body 28 communicates a hole 27b, which is formed in the housing 27 to communicate with the brake cylinder 2, with both the chamber 30 and the hole 28b in the upper part of the spool valve body 28, or to cut off the hole 27b from both the chamber 30 and the hole 28b. Similarly, upward and downward sliding movement of the spool valve body 28 communicates a hole 27c, which is formed in the housing 27 to communicate with the downstream side of the orifice 21, with the hole 28c in the lower part of the spool valve body 28, or cuts off the hole 27c from the hole 28c. Accordingly, the valve housing 27 and the spool valve body 28 construct the passage changeover valve 11 which communicates the brake cylinder 2 with the sump device 9 when the brake cylinder pressure is decreased, or communicates the discharge side of the pump 19 with the brake cylinder 2 through the orifice 12 when the brake cylinder pressure is increased again.

A solenoid valve main body 32 is fixedly fitted into the bore of the main body 22a and is situated in the lower part of the housing 27. The main body 32 has a bore in which a valve body 33 is inserted and is capable of sliding in the axial direction. The main body 32 is provided with an axially extending hole 32a which communicates a chamber 34 between the valve body 33 and the main body 32 with a chamber 35 between the main body 32 and the spool valve 28, and with a passageway 32b which communicates the chamber 34 and the sump device 9. The upper end of the main body 32 is formed to have a diametrically extending groove 32d.

The end of the passageway 32b on the side of the chamber 34 is formed to have a valve seat 32c which seats the valve body 33. The valve body 33 is urged upwardly at all times by a spring 36. Accordingly, at the time of ordinary operation, the valve body 33 is seated on the valve seat 32c to cut off the chamber 34 and the sump device 9 from each other. Further, the main body 32 is provided with a solenoid coil 37 so as to surround the valve body 33. By energizing the solenoid coil 37, the valve body 33 is lowered against the spring force of the spring 36, whereby the chamber 34 and the sump device 9 are brought into communication. The pressure-reducing valve 14 is constructed by the valve 33 and valve seat 32c.

The valve assembly 22 thus constructed has a passageway of a very simple construction since the shut-off valve 4, movable orifice 12, passage changeover valve 11 and pressure reducing valve 14 are coaxially arranged. At the time of ordinary operation, the valve body 22 is in the state illustrated in FIG. 2(a).

The operation of the antiskid brake control apparatus according to the embodiment as thus constructed will now be described.

In the ordinary state shown in FIG. 2(a), the valve body 23 is spaced away from the valve seat 27a and the valve body 33 is seated on the valve seat 32c. More specifically, the shut-off valve 4 is situated at the A position, the passage changeover valve 11 is situated at the C position, and the pressure-reducing valve 14 is situated at the F position, as shown in FIG. 1. When brake pedal is depressed under these conditions to apply braking, the brake fluid in the master cylinder 1 is fed into the brake cylinder 2 through the chamber 24, passageway 23a, chamber 25 and chamber 26 as indicated by the arrow, whereby braking is applied. When the brake pedal is released, the brake fluid in the brake cylinder 2 flows in the direction opposite that of the arrow and returns to the master cylinder 1, as a result of which the brake is released.

When a wheel starts skidding at braking, an electronic control unit (not shown) energizes the solenoid coil 37. As a result, the valve body 33 separates from the valve seat 32c, as shown in FIG. 2(b), the pressure-reducing valve 14 switches over to the G position, and the pump 19 is driven at the same time. Consequently, the brake fluid in chamber 35 is discharged into the sump device 9 through the hole 32a, the chamber 34, the pressure-reducing valve 14, which is in the open state, and the passageway 32b. As a result, a pressure differential is produced across the movable orifice 12 so that the spool valve body 28 descends against the spring force of spring 17 to occupy the E position. Accordingly, the brake fluid in the brake cylinder 2 is discharged into the sump device 9 through the passage 10, namely the hole 27b, chamber 30, hole 28a, orifice 13, groove 32d, chamber 35, hole 32a, chamber 34, open pressure-reducing valve 14 and passageway 32b. By virtue of this operation, brake hydraulic pressure is decreased, and the brake fluid discharged from the sump device 9 is fed by the pump 19 to the supply passage 3, which communicates the volume chamber 20 and the master cylinder 1.

At this time, the spacer 29, movable orifice 12 and valve body 23, which have been urged upwardly by the spring 17 via the spool valve body 28, descend under the spring force of the spring 5 since the upward biasing force is lost owing to descent of the spool valve body 28. In addition, the valve body 23 descends until it is seated on the valve seat 27a, and the shut-off valve 4 assumes the B position, at which it shuts the supply passage 3. Though the movable orifice 12 and spacer 29 descend further owing to the action of gravity and the like, a flange 29c of the spacer 29 comes into contact with a pin 38, whereby downward movement is checked. Thus, the shut-off valve 4, passage changeover valve 11 and pressure reducing valve 14 are set in the reduced-pressure state illustrated in FIG. 2(b).

In the reduced-pressure state of FIG. 2(b), the shut-off valve 4 is closed and the passage changeover valve 11 shuts the bypass passage 8, so that the discharge side of the pump 19 is cut off from the brake cylinder 2 and the intake side of the pump. As a consequence, the brake fluid supplied from the pump 19 is not supplied to the brake cylinder 2 and the intake side of the pump, and therefore no fluid is consumed and the burden on the pump 19 is reduced.

When skidding of the wheel is eliminated, the electronic control unit de-energizes the solenoid coil 37, as a result of which the valve body 33 is seated on the valve seat 32c and the pressure-reducing valve 14 occupies the F position, which is the shut-off position, thereby shutting the discharge passage 10. Consequently, the flow of brake fluid to the sump device 9 stops so that the pressure differential across the orifice 13 vanishes. As a result, the spool valve body 28 is raised by the spring 17 and abuts against the spacer 29. Furthermore, the movable orifice 12, spacer 29 and spool valve body 28 rise so that the upper end of the movable orifice 12 comes into contact with the valve body 23 seated on the valve seat 27a. However, since the valve body 23 is held in the state in which it is seated on the valve seat 27a by the pressure differential between the chamber 24 and the chamber 26, the movable orifice 12, spacer 29 and spool valve body 28 rise no farther and are maintained at their present positions. With the spool body 28 at this position, the hole 27b is closed whereas the bypass passage 8 is opened, and hence the discharge passage 10 is closed. Accordingly, the passage changeover valve 11 is set at the D position. Meanwhile, the shut-off valve 4 is maintained in the shut-off state Thus, the shut-off valve 4, passage changeover valve 11 and pressure-reudcing valve 14 are set in the state shown in FIG. 2(c), which is a state in which pressure is increased again.

In the state of FIG. 2(c) in which pressure is increased again, the brake fluid from the pump 19, volume chamber 20 and master cylinder 1 is supplied to the brake cylinder 2 through the bypass passage 8, namely the holes 27c, 28c, 28a, 29a, chamber 31, movable orifice 12, groove 23b and chamber 26, whereby brake hydraulic pressure is increased again. At this time, the flow rate of the brake fluid is limited by the movable orifice 12. This prevents a sudden increase in the brake hydraulic pressure and rapidly prevents the wheel from skidding again.

Thus, in the present embodiment, a decrease in the brake cylinder pressure is carried out rapidly, as a result of which skidding of the braked wheel is quickly eliminated. In addition, an increase in the brake cylinder pressure is performed at moderated speed, so that the braked wheel is rapidly prevented from skidding again when pressure is increased again. Thus, excellent antiskid braking control can be carried out.

During one braking operation, antiskid braking control, in which the pressure reducing operation shown in FIG. 2(b) and the operation for increasing pressure again shown in FIG. 2(c) are repeated, is performed in response to skidding of a wheel. When the brake pedal is released to terminate braking, brake hydraulic pressure in the master cylinder 1 diminishes so that the pressure in chamber 26 rises above that in chamber 24. Owing to this pressure differential, the valve body 23 rises and separates from the valve seat 27a so that the shut-off valve 4 occupies the A position, at which the valve opens the supply passage 3. Since the elevation of the valve body 23 is accompanied by elevation of the spool valve body 28, the passage changeover valve 11 occupies the C position, at which the bypass passage 8 and the discharge passage 10 are both opened. Thus, the shut-off valve 4, passage changeover valve 11 and pressure-reducing valve 14 are set in the ordinate state illustrated in FIG. 2(a).

The present invention is not limited to the foregoing embodiment but can be modified in various ways.

For example, in the embodiment described above, the spool valve body 28 is provided with the orifice 13 for generating the pressure differential that moves the spool valve body 28. However, the orifice 13 can be provided at a suitable location in the discharge passage 10, and not in the spool valve body 28. In such case, it goes without saying that it will be necessary to provide a pilot passage for introducing the pressure differential produced by the orifice 13 to the spool valve body 28.

In the antiskid brake control apparatus according to the invention, as should be apparent from the foregoing description, the discharge side of the pump is completely cut off not only from the brake cylinder but also from its own intake side at the time of the pressure decrease during antiskid braking control. As a result, the brake fluid discharged from the pump is not consumed at all, and the burden on the pump is reduced. Accordingly, it is unnecessary to enlarge the discharge capacity of the pump, so that a pump of comparatively small size can be used. Moreover, the durability of the pump is enhanced by alleviating the load upon the pump.

In accordance with the present invention, a two-way solenoid valve is used. As a result, the overall control apparatus can be made small in size and the structure of the passages in the apparatus are very simple in structure.

Further, according to the invention, the decrease in brake cylinder pressure is performed at a rapid rate. Accordingly, skidding of the braked wheel can be eliminated promptly. In addition, since the increase in brake cylinder pressure is carried out at a moderate rate, the braked wheel can rapidly be prevented from skidding again at the time pressure is increased again. Thus, excellent antiskid braking control can be carried out.

As many apparently widely different embodiments of the present invention can be made without departing from the spirit and scope thereof, it is to be understood that the invention is not limited to the specific embodiments thereof except as defined in the appended claims.

What we claim is:

1. An antiskid brake control apparatus comprising:
    a first supply passage for communicating a master cylinder and a brake cylinder;
    a shut-off valve arranged in said first supply passage for shutting off said first supply passage at antiskid braking control;
    a sump device into which brake fluid supplied to the brake cylinder is discharged;
    a discharge passage for communicating the brake cylinder and said sump device;
    a normally-closed two-way solenoid valve provided in said discharge passage;
    a second supply passage provided in said first supply passage for communicating the master cylinder and the brake cylinder while bypassing said shut-off valve;
    flow-rate control means having a first orifice arranged in said second supply passage for limiting flow of brake fluid from the master cylinder and from a discharge side of a pump to the brake cylinder;
    said pump for pressure feeding and circulating brake fluid, which has accumulated in said sump device, to said second supply passage on a side thereof upstream of said first orifice;
    a second orifice provided in said discharge passage; and
    a passage changeover valve arranged in said second supply passage for communicating or cutting off the discharge side of said pump and the brake cylinder;
    wherein pressure (P1) upstream of said second orifice is introduced to one end face of said passage changeover valve and pressure (P2) downstream of said second orifice is introduced to the other end face of said passage changeover valve to produce a pressure differential ($\Delta P = P1 - P2$) whereby said passage changeover valve is set to a first position, when brake cylinder pressure is decreased during antiskid braking control, at which said passage changeover valve cuts off the discharge side of said pump and the brake cylinder, and to a second position, when brake cylinder pressure is increased during antiskid braking control, at which said changeover valve communicates the discharge side of said pump with said flow-rate control means and communicates the discharge side of said pump with the master cylinder and the brake cylinder solely through said first orifice in said flow-rate control means.

2. The apparatus according to claim 1, wherein said flow-rate control means and said passage changeover valve are formed as an integrated body.

3. The apparatus according to claim 1, wherein said shut-off valve and said flow-rate control means are formed as an integrated body.

4. The apparatus according to claim 1, wherein said second orifice is formed in said flow-rate control means.

5. The apparatus according to claim 1, wherein said shut-off valve comprises:
    a valve seat formed on one of a housing and a member fixed to the housing; and
    a sliding valve body seated on said valve seat;

said sliding valve body being urged toward said valve seat at all times by a spring.

6. The apparatus according to claim 1, wherein said shut-off valve, said flow-rate control means and said passage changeover means are arranged coaxially, said shut-off valve being opened by urging said flow-rate control means and said passage changeover valve toward said shut-off valve at the time ordinary braking.

7. The apparatus according to claim 1, wherein when said passage changeover valve is set at said first position, said discharge passage is opened at the same time, and when said passage changeover valve is set at said second position, said discharge passage is closed at the same time.

* * * * *